(12) United States Patent
Bussard

(10) Patent No.: US 7,227,627 B1
(45) Date of Patent: Jun. 5, 2007

(54) OPTICAL BIAXIAL ANGLE SENSOR

(75) Inventor: Paul Emerson Bussard, Santa Rosa, CA (US)

(73) Assignee: L-3 Communications Sonoma EO, Inc., Santa Rosa, CA (US)

( * ) Notice: Subject to any disclaimer, the term of this patent is extended or adjusted under 35 U.S.C. 154(b) by 56 days.

(21) Appl. No.: 11/166,914

(22) Filed: Jun. 23, 2005

(51) Int. Cl.
*G01B 11/26* (2006.01)

(52) U.S. Cl. .............................. 356/152.2; 356/152.1; 356/152.3; 356/139.01

(58) Field of Classification Search ............... 356/152.2
See application file for complete search history.

(56) References Cited

U.S. PATENT DOCUMENTS

| | | | |
|---|---|---|---|
| 3,799,675 A | * | 3/1974 | Johnson et al. .......... 356/152.1 |
| 4,659,219 A | | 4/1987 | de Fleurieu et al. |
| 5,044,751 A | | 9/1991 | Singer et al. |
| 5,513,000 A | | 4/1996 | Smith et al. |
| 6,384,908 B1 | | 5/2002 | Schmidt et al. |
| 6,504,605 B1 | * | 1/2003 | Pedersen et al. .......... 356/141.1 |

* cited by examiner

*Primary Examiner*—Thomas H. Tarcza
*Assistant Examiner*—Luke Ratcliffe
(74) *Attorney, Agent, or Firm*—Pillsbury Winthrop et al.

(57) ABSTRACT

A fast and accurate non-contacting angle sensor. According to one aspect of the described sensor and method of operation thereof, the angular orientation of an inner payload relative to an outer structure is monitored with a 2 axis optical angle sensor for azimuth and elevation angles. The sensor operates on the same principle as an autocollimator, thus it measures both azimuth and elevation angles simultaneously. The angle sensor measurements are highly accurate in the angles of interest, while having low sensitivity to translation in three axes and low sensitivity to roll angle between the inner payload and the outer structure.

23 Claims, 6 Drawing Sheets

$I_1(x) = 0.5\sin(2\pi f_1 x) + 0.5$ $I_2(x) = 0.5\sin(2\pi f_2 x) + 0.5$

OPTICAL BIAXIAL ANGLE SENSOR

FIELD OF THE INVENTION

The present invention relates generally to angle sensors, and in particular to fast and accurate non-contacting bi-axial angle sensors.

BACKGROUND OF THE INVENTION

Many applications require fast and accurate measurement of a relative angular orientation between two points. For these and other applications, angle sensors have been developed. Certain sensors require mechanical or other physical contact between the two bodies whose relative orientation is being studied. However, these types of sensors are undesirable in applications where complete freedom of movement between the two bodies is required.

Accordingly, it would be desirable if a non-contacting angle sensor could be developed that is both accurate and fast.

SUMMARY OF THE INVENTION

The present invention provides a fast and accurate non-contacting angle sensor. According to one aspect of the invention, the angular orientation of an inner payload relative to an outer structure is monitored with a 2 axis optical angle sensor for azimuth and elevation angles. The sensor operates on the same principle as an autocollimator, thus it measures both azimuth and elevation angles simultaneously. An object pattern affixed to the outer structure comprising an aharmonic variation of intensities, and which does not repeat over the full measurement range, is illuminated, reflected off the inner payload and analyzed to determine the angular orientation. The angle sensor measurements are extremely accurate for the angles (e.g. azimuth and elevation) of interest, while highly immune to translation in three axes, as well as roll angle between the inner payload and the outer structure.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not necessarily be limited to that embodiment but should encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1A:
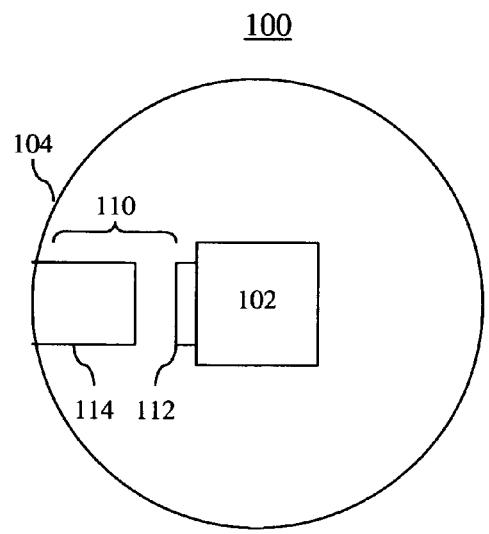
FIGS. 1A to 1C illustrate different views of an example application of an angle sensor in accordance with the present invention.
Figure 1B:
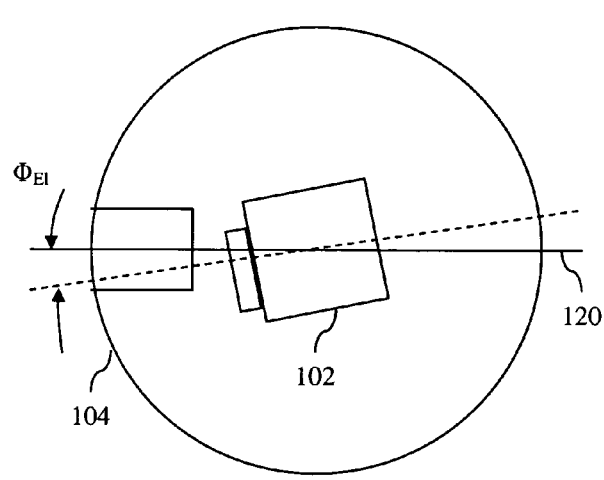
Figure 1C:
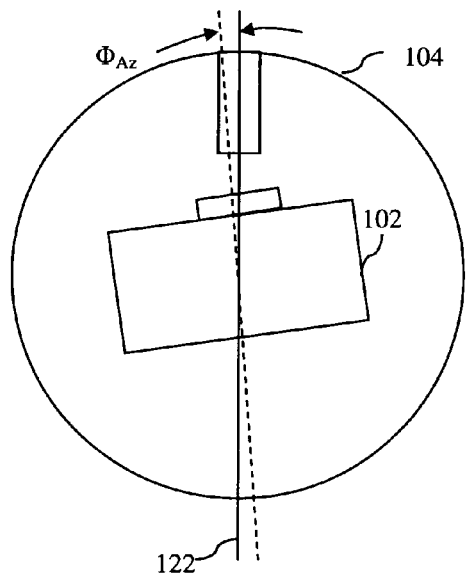

FIGS. 1A to 1C are various views of an example application of the principles of the present invention.

As shown in FIG. 1A, an inner payload 102 is disposed in a payload object 100 having an outer structure 104. In one example application of the principles of the invention, the payload object 100 is a gimbal which is usually mounted on a surveillance craft such as an airplane, and the inner payload 102 is a package of sensors and associated and/or additional electronics. In such an application, a finite range of movement between the inner payload 102 and the outer structure 104 is allowed, and in fact required, to stabilize the inner payload 102 from vibrations and other instantaneous anomalies afflicting the craft, and thus the outer structure 104. In accordance with the invention, an angle sensor 110 has an outer portion 114 mounted to the outer structure 104 and an inner payload portion 112 mounted to the inner payload 102. In accordance with the invention, however, there is no immediate physical contact between the outer portion 114 and the inner payload portion 112. Rather, optics, optoelectronics and digital image signal processing techniques are used by sensor 110 to continuously measure and determine a biaxial angular orientation between the outer structure 104 and the inner payload 102.

As further illustrated in the side view of FIG. 1B, and top view in FIG. 1C, the sensor apparatus according to the invention is provided so as to simultaneously measure relative angular displacement between the inner payload 102 and outer structure 104 with respect to two axes. More particularly, as shown in FIG. 1B, the sensor measures angular displacement $\phi_{El}$ in elevation 120 and angular displacement $\phi_{Az}$ in azimuth 122 between the inner payload 102 and outer structure 104.

Figure 2:
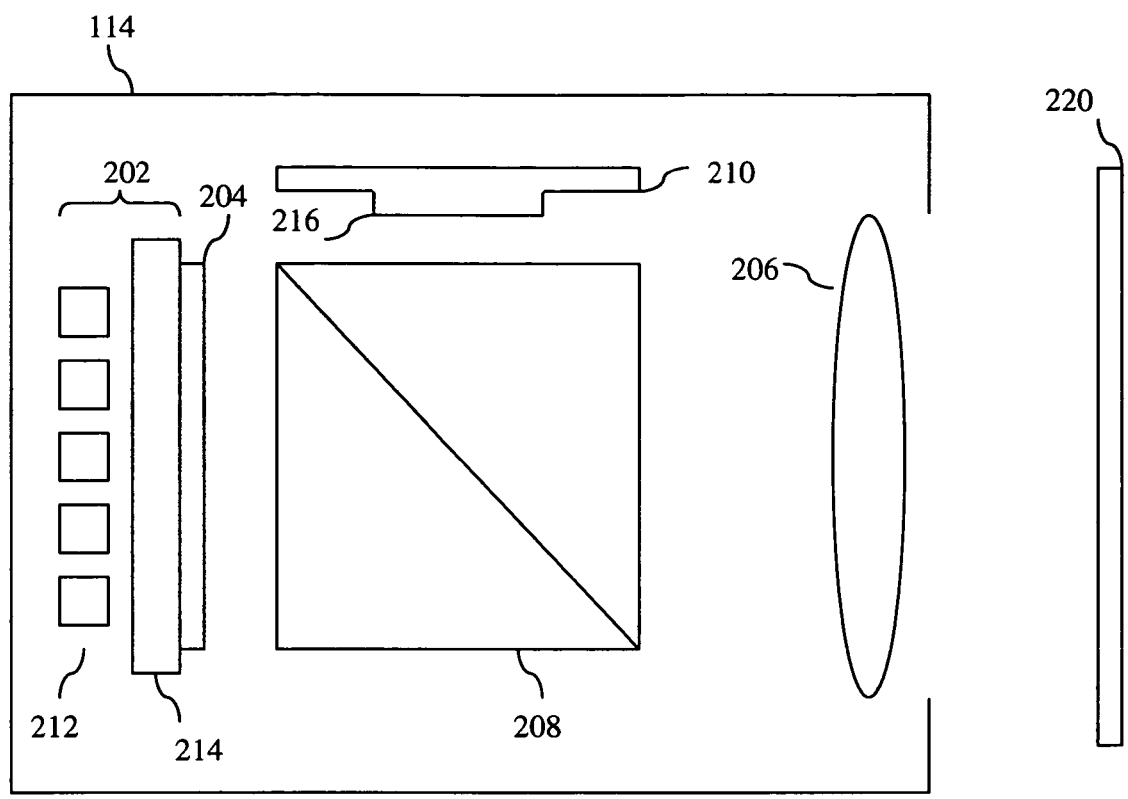
FIG. 2 is a block diagram illustrating an example sensor apparatus in accordance with the present invention.

FIG. 2 is a block diagram illustrating an example angle sensor 110 in accordance with the principles of the invention.

As shown in FIG. 2, in this example of angle sensor 110, outer sensor portion 114 is comprised of a light source 202, spatial filter 204, collimator 206, beam splitter 208, detection camera 210, and is rigidly mounted to the outer structure 104. Inner payload portion 112 is comprised of a flat mirror 220 which is mounted, in view of the light beam from source 202, to the inner payload 102.

It should be noted that outer portion 114 preferably includes computing means, such as a microprocessor and associated program and data memory (not shown), that performs angle calculations on data collected by detection camera 210 in a manner that will be described in more detail below. It should be further noted that angle sensor 110 may further include focusing and alignment means so as to focus and align the light beam throughout the optical path. The provision and arrangement of such focusing and alignment means will become apparent to those skilled in the art after being taught by the present disclosure.

Light source 202 is disposed to back-illuminate spatial filter 204, and is a diffuse source formed by a pulsed LED array 212 and a diffuser 214. In one example of the invention, LED array 212 is driven with a 1 µs pulse for a fast exposure time and is synchronized to the sampling of various outer structure sensors to allow calculation of the instantaneous angle of the inner payload relative to the outer structure mounting points. As a further preferred example, the LED array 212 is pulsed at a 60 Hz rate allowing angle updates at 60 Hz.

Although various arrangements of array 212 may be possible, such as a uniform distribution of light across the length and width of diffuser 214, accuracy, linearity, and noise may be improved by adjusting the intensity distribution of the light source and/or the spatial filter pattern to compensate for intensity variation due to light vignetted by the optics which is a function of the angle measured. Thus the periphery of the object filter 204 could be illuminated with greater intensity than the center. Alternately, this intensity variation could be incorporated in the spatial filter pattern design.

Spatial filter 204 is comprised of a 11 mm by 11 mm glass substrate and a chrome pattern forming an object on the surface of the substrate. As will be explained in more detail below, a preferred example of the spatial filter object pattern is comprised of 0.4 µm feature sizes having a sinusoidal variation in density along two orthogonal axes. The spatial filter object pattern provided on the surface of spatial filter 204 is positioned at the focal plane of collimator 206. Light filtered by the object is passed through beam-splitter 208. The deflected portion is not desired and is discarded by an absorber, while the desired, un-deflected, portion is collimated by collimator 206, which is in one example a 25 mm aperture converging lens.

The collimated light is directed toward mirror 220 mounted to the inner payload 102 which reflects the collimated light, returning it to the converging lens 206. The collimating lens 206 and mirror 220 are proximally located within a distance D so as to preferably allow a detectable level, such as 10%, of light to still be captured at the extremes of the useful angular range.

Figure 3A:
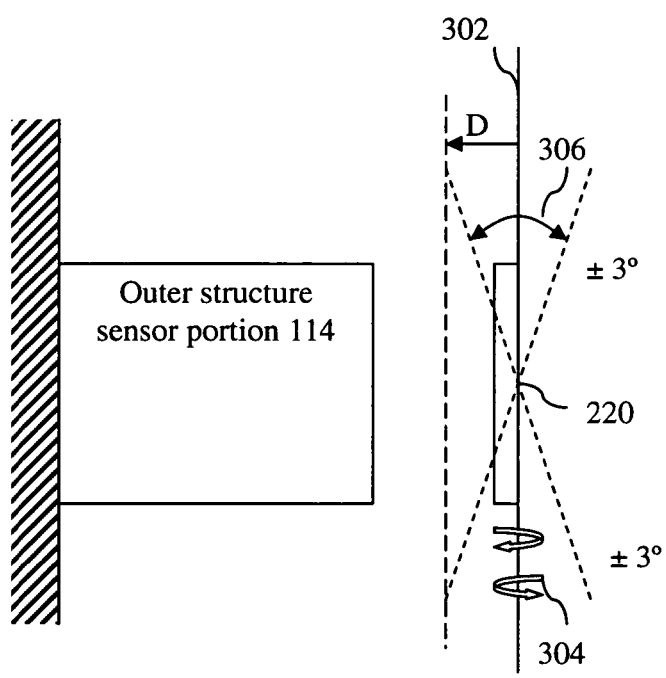
FIGS. 3A to 3C are diagrams illustrating how angle measurements are obtained using a sensor apparatus according to the present invention.

More particularly, as further shown in FIG. 3A, in one example application of the invention, mirror 220 is mounted in a plane 302 defined by the inner azimuth and elevation axes of the inner payload 102, and is a 50 mm diameter flat mirror. As a further example of this application, the range of motion 304 about the azimuth axis with respect to the outer structure 104, and the range of motion 306 about the elevation axis with respect to the outer structure 104, are both about ±3 degrees. In addition to angular motion, there may also be translations, so D needs to consider both translation and angle to avoid collision with 114. In an example where the mirror is 50 mm, translations of ±8 mm radius in any direction are possible. The distance D shown in FIG. 3A represents the farthest possible deflection of mirror 220 based on the range of motion and the size of mirror 220, and further represents the minimum separation that should be permitted between mirror 220 and sensor portion 114. In a preferred example including dimensions provided above, D should be greater than 1.3 mm+8 mm=9.3 mm to avoid collision, but D should also be less than 235 mm to still receive some light at the outer edges of 220 when it is deflected by 3 degrees. Accordingly, in this example, D is preferably 96 mm so as to capture 50% of uniformly distributed light at 3 degrees. To prevent roll movements of the flat mirror from cross coupling into a false azimuth or elevation motion the flat mirror should be aligned so its normal is as perfectly orthogonal as possible to both the azimuth and elevation axes.

Referring back to FIG. 2, returning light is again passed through beam splitter 208. This time the un-deflected portion is discarded and the deflected portion is focused on the focal plane of camera 210, which in one example is comprised of a 256×256 focal plane array (FPA) 216 of charge coupled devices (CCDs). In one example, FPA 216 of camera 210 is dimensioned to be one-sixth the length and width of spatial filter 204 and thus captures a subset of the spatial filter pattern, as will be explained in more detail below.

A particular sub-set of the two-dimensional object produced by spatial filter 204 appears as a light pattern having approximately the same size and corresponding variations of light intensity as the spatial filter pattern at camera 210. Any angular displacement of inner payload 102 with respect to the outer structure 104 will cause mirror 220 to be identically displaced, and the image reflected back on camera 210 will be correspondingly displaced.

Figure 3B:
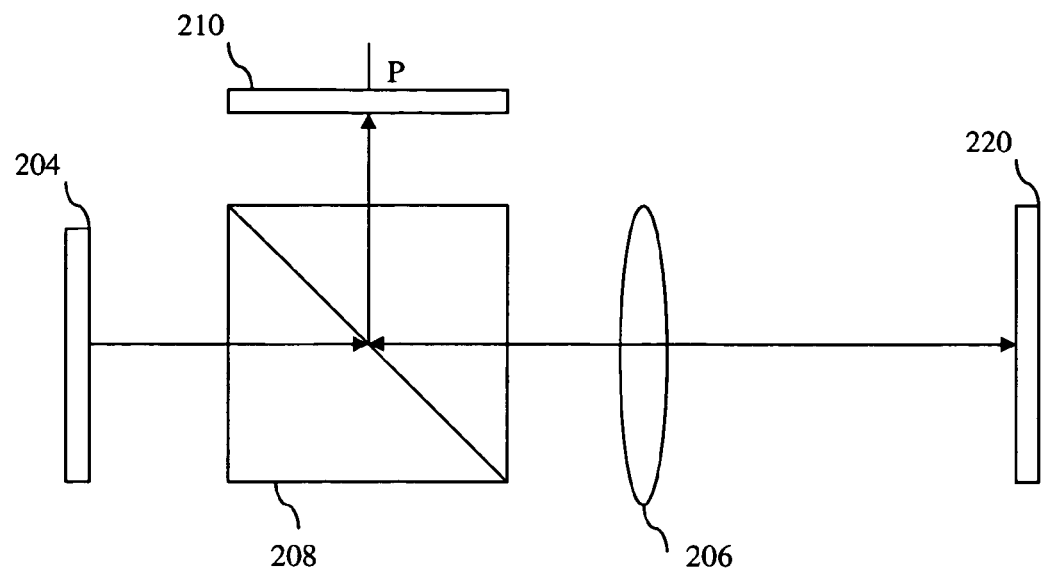
Figure 3C:
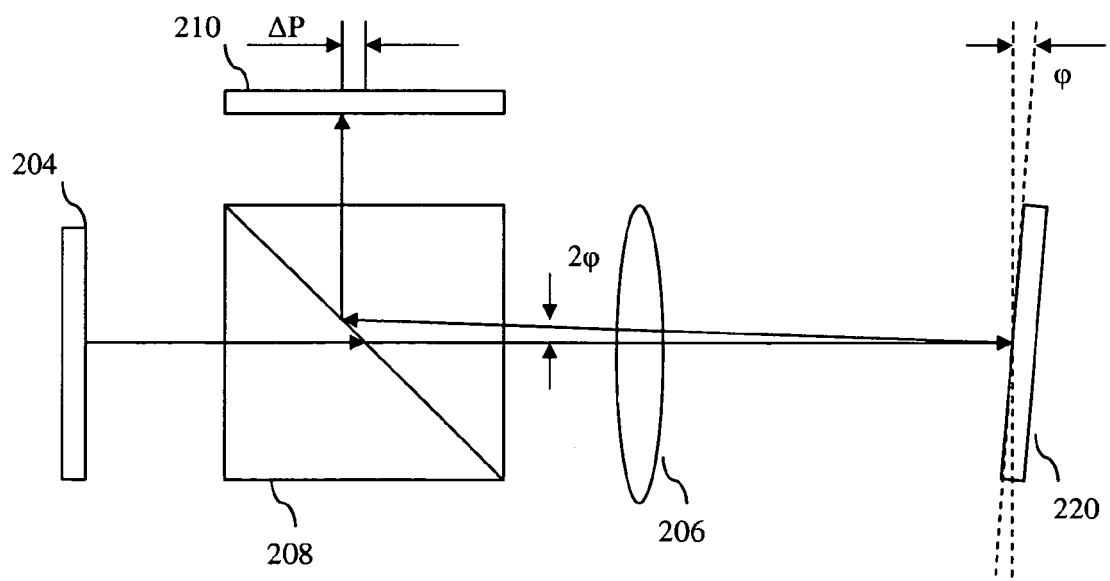

More particularly, as shown in FIG. 3B, a light beam from spatial filter 204 is directed to, and reflected by, mirror 220 through collimator 206, deflected through beam splitter 208, and impinge on camera 210 at point P, assuming no angular displacement of inner payload 102. FIG. 3C illustrates what happens when mirror 220 is displaced by angle $\phi$ due to corresponding displacement of inner payload 102 with respect to outer structure 104. The light beam is reflected by angle $2\phi$ from the original path from mirror 220, and impinges at a different point that is $\Delta P$ from the original point P on camera 210. This image displacement is measured and the angular displacement $\phi$ is derived therefrom in a manner that will be described in more detail below. However, it should be apparent that there is a straightforward geometric relationship between displacement $\Delta P$ and the angular displacement $\phi$.

The present invention can be implemented with a variety of spatial filter patterns that selectively attenuate the illuminating light to form a high resolution object. Many possible patterns can be used to create an intensity variation spatial waveform along one or more axes of interest. In addition to orthogonal Cartesian coordinates, the spatial filter may be described in other coordinates such as polar coordinates, or more complex mapping approaches. In some applications, more than two axes might be used, such as three axes separated by 60 degree offsets, to match the axes of movement being measured, or to provide redundant information which increases robustness. The patterns on individual axes may be combined by multiplication to create the final spatial filter pattern.

An example spatial filter pattern for use with spatial filter 204 is further described below in connection with FIGS. 4A–C. In this example, the full size object source 204 is difficult to illustrate, and so FIG. 4A illustrates a sub-set 402 of the example full object 204.

Figure 4A:
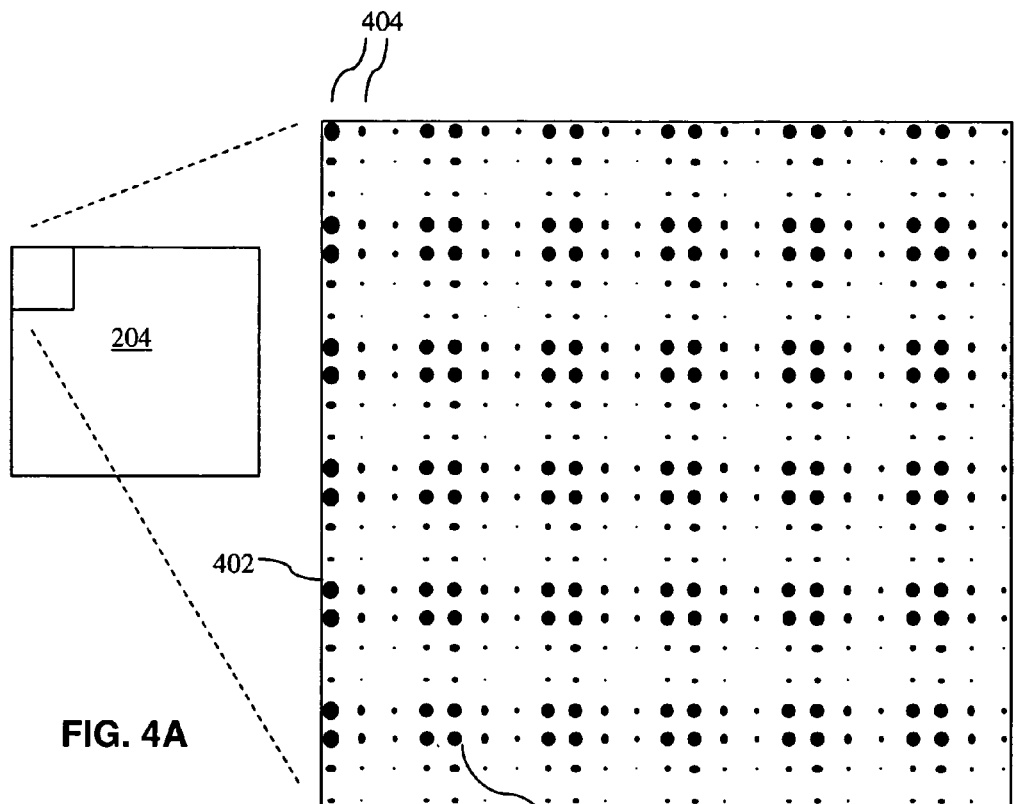
FIGS. 4A to 4C illustrate an example spatial filter pattern that can be used in a sensor apparatus according to the invention.

As shown in FIG. 4A, in the preferred embodiment, two orthogonal axes are used: x-axis for measuring azimuth motion, and y-axis for measuring elevation motion. As a further preferred embodiment, a spatial filter pattern having an intensity variation along each orthogonal axis defined by the sum of two sinusoids is used. This style of spatial filter can be expressed generally as:

$$I(x,y)=[A_x \text{SIN}(2\pi \cdot f_1 x)+B_x \text{SIN}(2\pi \cdot f_2 x)] \cdot [A_y \text{SIN}(2\pi \cdot f_1 y)+B_y \text{SIN}(2\pi \cdot f_2 y)]$$

where I(x,y) is the transmissibility of the spatial filter at coordinates x and y.

The amplitude parameters $A_x$, $B_x$, $A_y$, and $B_y$ are chosen to optimize the systematic error (interference between components) and the random error (signal to noise ratio) of each spectral component. Simulations suggest that equal amplitudes are preferred.

Figure 4B:
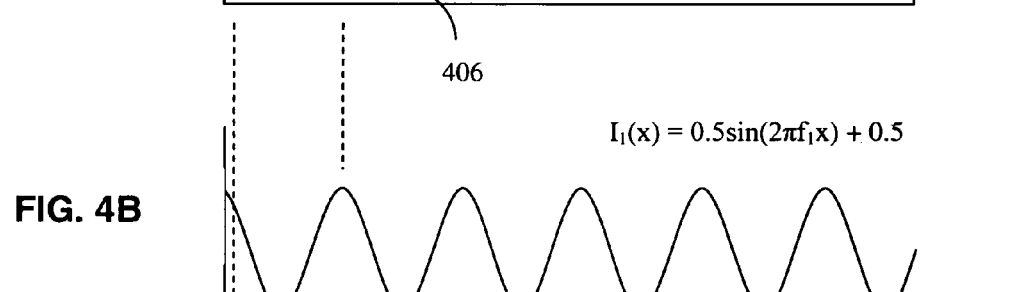
Figure 4C:
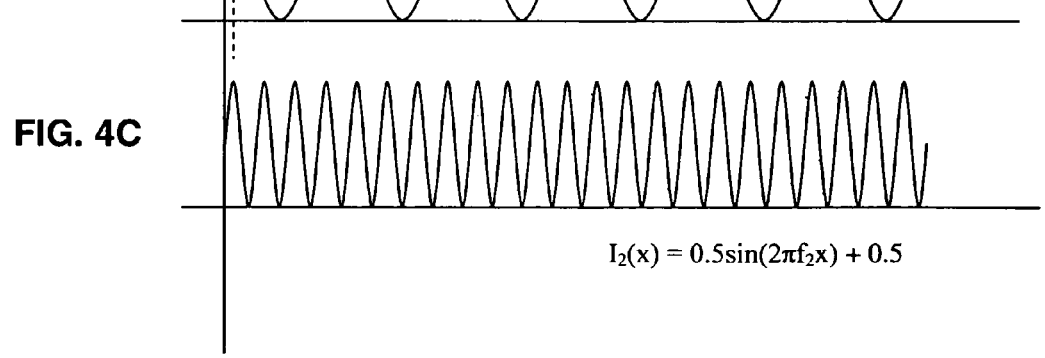

FIG. 4B illustrates the low frequency component $I_1(x)$ of the overall pattern along the x axis and large dots 406 in FIG. 4A indicate where corresponding peaks due to this component occur in the pattern subset 402. Likewise, FIG. 4C illustrates the high frequency component $I_2(x)$ of the overall pattern and linear patterns of dots 404 indicate where corresponding peaks due to this component occur in the pattern subset 402. It should be noted that the actual resulting pattern will appear visibly different from the illustration in FIG. 4A due to the sinusoidal intensity variations and interaction of the various components in both the x and y directions.

The frequency $f_1$ and the frequency $f_2$ are chosen to trade off measurement resolution verses immunity to noise variations, which might cause large measurement errors. This tradeoff can be determined through numerical simulation. In accordance with an aspect of the present invention, the waveform chosen in the preferred embodiment uses $f_1$ and $f_2$ with significant separation (i.e. varying from each other by several factors), and also are not harmonics of each other, resulting in an "aharmonic" overall variation of intensities. The individual components of the pattern are illustrated in FIGS. 4B and 4C. When the phase of $f_1$ is computed using the Fourier Transform method, the presence of $f_2$ causes some error and that error is reduced as $f_1$ and $f_2$ are further separated. Similarly, $f_1$ causes some error in computing the phase of $f_2$. These errors are predictable and correctable once the correct position is determined. However, if $f_1$ and $f_2$ are not sufficiently separated, their interference can lead to a 'wrap error' where the indicated angle position is offset by one or more full cycles of $f_1$ or $f_2$.

In the preferred embodiment the spatial filter intensity variation is described in the x-axis by:

$$I(x)=0.25 \text{ SIN}(2\pi \cdot 5.7x)+0.25 \text{ SIN}(2\pi \cdot 23x)+0.5$$

And in the y-axis by:

$$I(y)=0.25 \text{ SIN}(2\pi \cdot 5.7y)+0.25 \text{ SIN}(2\pi \cdot 23y)+0.5$$

The spatial filter intensity variation at any coordinate (x,y) is thus described by:

$$I(x,y)=I(x) \cdot I(y)=[0.25 \text{ SIN}(2\pi \cdot 5.7x)+0.25 \text{ SIN}(2\pi \cdot 23x)+0.5] \cdot [0.25 \text{ SIN}(2\pi \cdot 5.7y)+0.25 \text{ SIN}(2\pi \cdot 23y)+0.5]$$

Where the parameters x and y are in units of one field of view at the detector or image.

More particularly, in one example, the length and width of spatial filter 204 are chosen such that the pattern includes 138 cycles of the high frequency sinusoid (i.e. x & y range from 0 to 6). Accordingly, in this embodiment, the full spatial filter size is dimensioned to cover 6 views of the pattern, whereas the measurement range only covers 5 views. For example, when the camera sees the negative extreme, it is viewing the spatial filter from −3 to −2 views and indicates the center of this, −2.5 views, as the extreme negative angle (−3 degrees). At the positive extreme, it is viewing the spatial filter from +2 to +3 views and indicates the center of this, +2.5 views, as the extreme positive angle (+3 degrees). Thus the spatial filter needs to be 6 views wide to achieve a measurement range that is 5 views, or 115 cycles of the high frequency component, wide. In general, therefore, the spatial filter size is preferably one view larger than the measurement range, unless one is willing to sacrifice accuracy near the extremes.

Continuing with this example, the 115 cycles of the high frequency component occur across the measurement range of 5 views wide. This is less than the least common multiple of the high and low frequencies (i.e. 131.1 cycles of the high frequency component), thus ensuring that the pattern does not repeat itself and further preventing measurement ambiguities, which is an aspect of the invention, and will be discussed in more detail below. In one example of the invention using a 0.4 μm process, this yields an image pattern that is 8960 μm by 8960 μm across the measurement range, and thus more than 10752 μm by 10752 μm for the size of spatial filter 204. Further, in this example, the linear patterns of dots 404 in FIG. 4A showing the peaks in the high frequency component will be separated by approximately 10752 μm/138=78 μm.

A large variety of fabrication processes could be used to fabricate the spatial filter. Photographic methods could be used to produce a filter on an ordinary photographic slide, glass plate, or print. In a preferred embodiment, the type of photolithography process that is conventionally used for fabricating integrated circuit masks is used to produce a spatial filter comprised of chrome deposited on a glass substrate. This provides an accurate, stable substrate capable of operation over wide temperature ranges.

Feature size requirements at the spatial filter are preferably related to the pixel size of the detector, the magnification of the optics, and the number of bits of intensity resolution desired. For a detector pixel size of 7 μm, a magnification of 1, and 8 bits of intensity resolution, a feature size of 7 μm/16=0.44 μm allows an array of 16×16 features to adjust the intensity of the spatial filter pattern as detected by a single pixel. Using this method we approximate that features either pass light or block light in proportion to the area of the features, ignoring diffraction effects. Thus, a 16×16 array allows 256 intensities, or 8 bits of intensity resolution.

When illuminating the spatial filter with light at 500 nm wavelength, using a collimator focal length of 42 mm, and an aperture size of 25 mm, the Rayleigh criteria for the minimum resolvable feature size, d, is given by:

$$d=2.44 \lambda f/D=2.44(500 \text{ nm})(42 \text{ mm})/(25 \text{ mm})=2 \text{ μm}$$

In this preferred example, accordingly, the 0.44 μm features in the spatial filter will not be resolved by the 2 μm spot size produced at the detector, and so variation in spatial filter features primarily affect the intensity detected without any significant pattern related effects.

Since the intensity is determined by the number of features present or omitted on the spatial filter, there are many possibilities for choosing the placement of which features in a 16×16 array are present or omitted to achieve a particular intensity. A preferred embodiment distributes the features as evenly as possible over the 16×16 array, maintaining symmetry about the center of the array.

Referring back to FIG. 2, the spatial filter image reflected by mirror 220 is also preferably large enough so that even at the extremes of the range of motion between outer structure 104 and inner payload 102, a sufficient reflected image will be received at camera 210. This is further assured if the size of the image plane of camera 210 is significantly smaller than the size of spatial filter 204, and thus the reflected image. In a preferred embodiment of the invention, FPA 216 of camera 210 is a 1792 µm by 1792 µm plane, which is one-sixth the dimensions of the spatial filter 204, and is an array of 256×256 CCDs providing a pixel width of 7 µm by 7 µm. Further, by capturing only a portion of the pattern at the image plane, the resolution is improved.

Because FPA 216 has one-sixth the dimensions of spatial filter 204, in the above example of the spatial filter pattern, 23 cycles of the high frequency pattern will be captured across 256 pixels in both directions. This yields over 11 samples per cycle which is significantly over-sampled relative to the Nyquist rate of 2 samples per cycle. This over sampling improves immunity to smear, or loss of contrast, due to motion during the exposure time.

A method of determining an angular orientation that can be performed using the above described sensor apparatus will now be described in more detail below in connection with FIGS. 5 and 6.

Figure 5:
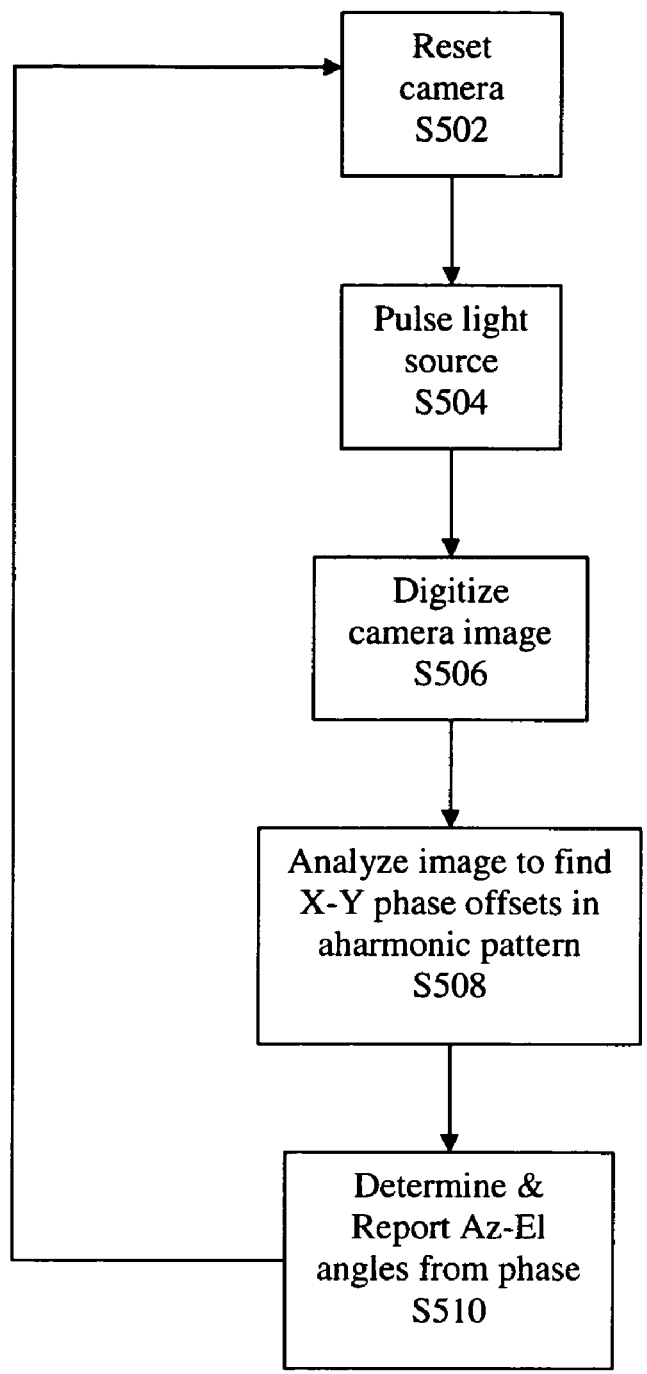
FIG. 5 is a flowchart illustrating an example method of operating a sensor apparatus to obtain angle measurements according to the invention.

As shown in FIG. 5, beginning in step S502, the camera (e.g. camera 210) is reset to clear any previous image data. Next in step S504, the light-source (e.g. light source 202) is pulsed for one exposure time. As set forth above, this step can include pulsing LED array 212 for a 1 µs exposure time at a rate of 60 Hz. Simultaneously with the pulsing of the light source, the light impinging on the camera (e.g. FPA 216) is sensed and digitized into image data in step S506. In a preferred example of the invention as described above, the image is an aharmonic pattern formed by a sum of sinusoids that has intensity variations along two orthogonal axes. Any angular displacement between the inner payload 102 and outer structure 104 will cause the pattern to be correspondingly displaced at camera 210, which can be measured as phase in the sinusoidal components of the patterns along the X and Y axes. This measurement is performed in step S508. The measured phase offsets are then used to determine the azimuth and elevation angle displacements, and are reported in step S510. Processing flow returns to step S502 until measurement operations are no longer needed.

Figure 6:
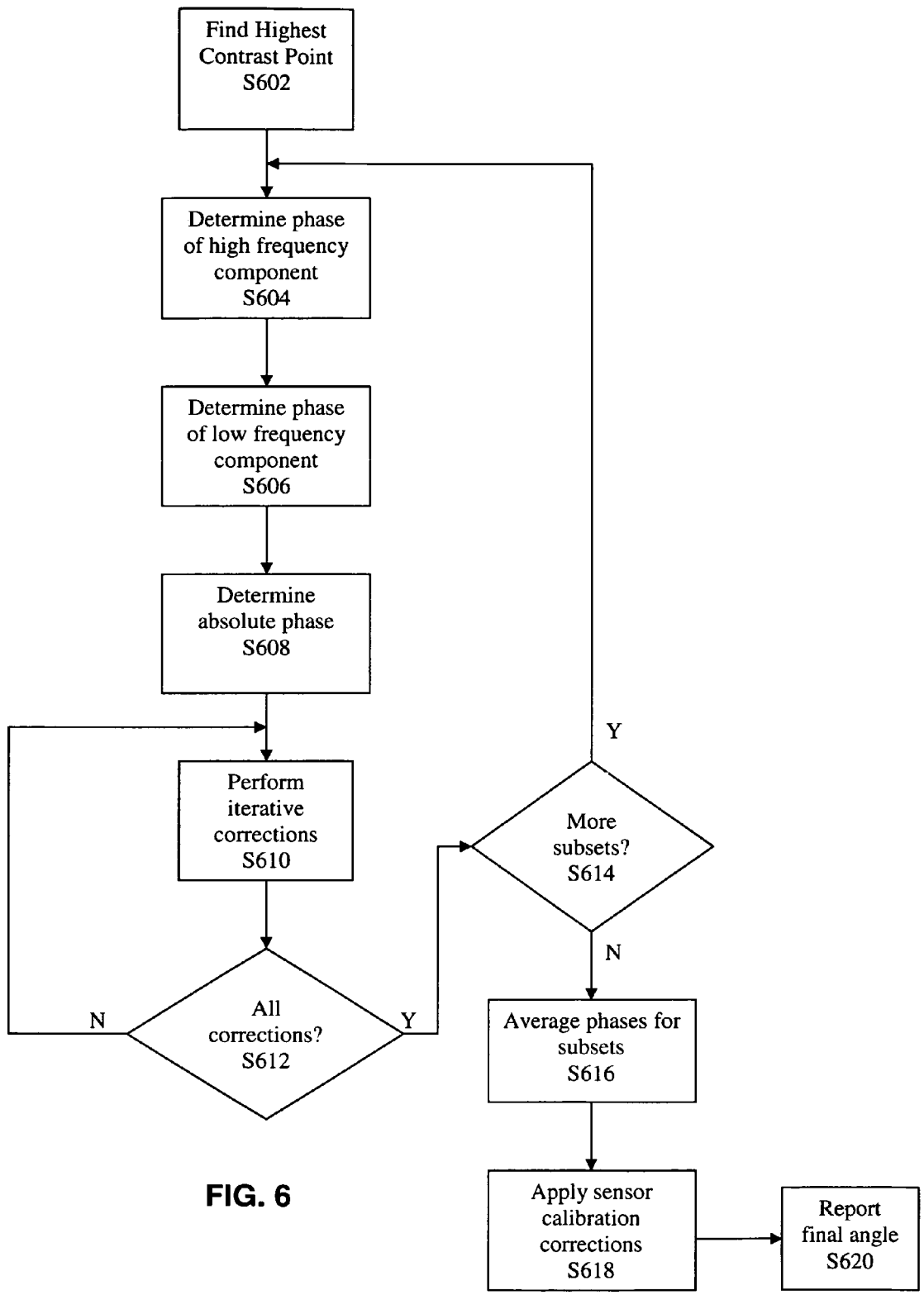
FIG. 6 is a flowchart illustrating an example method of determining a phase offset corresponding to angle displacement using the present invention.

FIG. 6 illustrates an example method of determining the X and Y phase angles (such as in steps S508 and S510 in the method above) from image data received at camera 210 (such as in step S506 in the method above) in more detail. FIG. 6 illustrates processing for one angle, for example either azimuth or elevation. Similar processing could be used for both angles. Moreover, separate angle processing, either in whole or in part, could occur simultaneously or sequentially, as a matter of design choice.

As shown in FIG. 6, processing begins in step S602 where a subset of the image array data is selected for analysis of best contrast regions. In one example, the size of the subset corresponds to approximately one full cycle of the high frequency component $f_1$ in each axis, for example, data corresponding to 12×12 pixel area of the image. Because this component of the pattern in the image repeats, any subset of the image will suffice, but a subset in the center is preferably selected because it will likely have the best image quality. This subset is searched to find the highest intensity pixel, $(X_P, Y_P)$, which indicates the region of best contrast in this subset. Depending on which angle is being determined, either a row or column of 256 pixel data containing this pixel will be selected. Thus, if azimuth is being determined, a row across the full array of x-axis intensities through pixel $(X_P, Y_P)$ form a waveform $I(X_i, Y_P)$ with high contrast representing azimuth position. If elevation is being determined, a column across the full array of y-axis intensities through pixel $(X_P, Y_P)$ form a waveform $I(X_P, Y_i)$ with high contrast representing elevation position.

Next, in step S604, a Fourier transform is applied to the waveform data to determine the phase offset of the waveform. The method of mapping the waveform data, such as $I(X_i, Y_P)$, to an absolute angle position is similar for both the azimuth and elevation waveforms, so the process is described for a waveform, $I(i)$, without distinguishing its orientation.

Preferably, a Discrete Fourier Transform method is used to find the phase $\emptyset_1$ of the low frequency component $f_1$ from a composite waveform $I(i)$ consisting of m samples. In this example of FPA 216, m is 256 (it should be noted that non-integral samples may be discarded, as will be discussed in more detail below). An arctangent function is used, which might normally return a value between $-\pi$ and $\pi$; however, since the sign of both the numerator and denominator are known, this knowledge is used to map the result over the range 0 to $2\pi$. For $f_1$ and $f_2$ in units of cycles/m, the following processing is performed:

$$\text{SIN}x\text{form}_1 = \sum_i I(i) \cdot \text{SIN}(2\pi \cdot f_1 \cdot i/m)$$

$$\text{COS}x\text{form}_1 = \sum_i I(i) \cdot \text{COS}(2\pi \cdot f_1 \cdot i/m)$$

$$\emptyset_1 = \text{ATAN}\left[\frac{-\text{SIN}x\text{form}_1}{\text{COS}x\text{form}_1}\right] + \pi - \text{SIGN}[\text{COS}x\text{form}_1] \cdot \pi/2$$

Next, in step S606, the phase $\emptyset_2$ of high frequency component $f_2$, is calculated in the same fashion from composite waveform $I(i)$:

$$\text{SIN}x\text{form}_2 = \sum_i I(i) \cdot \text{SIN}(2\pi \cdot f_2 \cdot i/m)$$

$$\text{COS}x\text{form}_2 = \sum_i I(i) \cdot \text{COS}(2\pi \cdot f_2 \cdot i/m)$$

$$\emptyset_2 = \text{ATAN}\left[\frac{-\text{SIN}x\text{form}_2}{\text{COS}x\text{form}_2}\right] + \pi - \text{SIGN}[\text{COS}x\text{form}_2] \cdot \pi/2$$

Next, S608, calculations are performed to determine the unambiguous values of the phase offset from the calculated values $\emptyset_1$ and $\emptyset_2$. In particular, the high frequency result is ambiguous relative to the absolute angle desired as it repeats for every cycle of the high frequency pattern that is crossed due to changes in the measured angle. Moreover, the low frequency result is also ambiguous relative to the absolute phase angle. However, provided that $f_1$ and $f_2$ are chosen with a least common multiple beyond the range used to map absolute measurement angles, it should be possible to uniquely map the absolute angle from the measured values of $\emptyset_1$ and $\emptyset_2$. This mapping is greatly simplified by the appropriate choice of $f_1$ relative to $f_2$.

For example, frequency $f_2$ is chosen to provide an integral number of cycles across the sampled waveform, such as 23 cycles across 256 sample points. This provides the best accuracy when processing the Fourier Transform math. Alternatively, samples may be discarded to leave an integral number of cycles of $f_2$ when calculating the Fourier Transform.

A 'measurement range', is chosen as some multiple of $f_2$, such as $a \cdot f_2$, where factor 'a' is a positive real number. For example, if factor 'a' is chosen to be 5, there will be $5 \cdot 23 = 115$ cycles across the measurement range. The absolute angle range is mapped to this measurement range by the choice of collimator focal length and detector pixel size. For example, if $f_2$ has 23 cycles across 256 sample points, it has $a \cdot 256 = 5 \cdot 256 = 1280$ samples across the measurement range. For an example where pixel size is 7 μm and a collimator focal length is 42 mm, each pixel represents an angular change of the received light beam of:

$$IFOV = A\ TAN(7\ \mu m / 42\ mm) = 167\ \mu rad$$

For the case where the object source is designed to compensate for optical distortions and sine angle projection at the FPA plane, the field of view of the received light beam is:

$$FOV = (1280\ samples) \cdot IFOV = 0.213\ rad = 12.2°$$

The absolute angle range, which describes the angular variation of the flat mirror mounted to the inner payload, has half the sensitivity of the FOV due to the reflection off the flat mirror, thus:

$$Absolute\ Angle\ Range = FOV/2 = 6.1°$$

If a hypothetical frequency, $f_3$, is chosen such that:

$$a \cdot f_3 = a \cdot f_2 + \delta$$

then $\delta$ represents the difference in total cycles across the measurement range between $f_2$ and $f_3$. While many choices of $\delta$ could be utilized, the range between $-1$ and $+1$ eliminates ambiguity in calculating absolute measurement position. Furthermore, the choice of $-1$ provides the best noise immunity, so $\delta = -1$ will be used for the balance of this explanation. Thus:

$$f_3 = f_2 - 1/a$$

Note that $a \cdot f_3$ is one cycle different than $a \cdot f_2$ across the measurement range, such as 114 cycles, relative to 115 cycles. The absolute measurement position is easily determined from the difference in phase between $a \cdot f_3$ and $a \cdot f_2$ because this phase varies across a single cycle over the measurement range, providing no ambiguity. However, $f_2$ and $f_3$ are so close in frequency that a large number of samples are required to distinguish their phase using the Fourier Transform method without significant interaction.

Instead, $f_1$ is chosen as $f_3$ divided by an integer, N:

$$f_1 = f_3/N$$

Substituting for $f_3 = f_2 - 1/a$:

$$f_1 = f_2/N - 1/(a \cdot N)$$

For example, for $f_2 = 23$, $a = 5$, $N = 4$, $f_1 = 23/4 - 1/(5 \cdot 4) = 5.7$ cycles/view.

When calculating the phase of the low frequency component $f_1$, i.e. $\varnothing_1$, using the Fourier Transform method described above, 31 samples are discarded (e.g. from any combination of the two ends) leaving 5 cycles across the remaining 225 samples. Since we have chosen to make $f_3 = N \cdot f_1$, we can similarly calculate the phase of the $f_3$, $\varnothing_3$ using:

$$\varnothing_3 = N \cdot \varnothing_1$$

An absolute phase, $\varnothing_{ABS}$ is calculated by:

$$\varnothing_{ABS} = MOD\ [\varnothing_2 - \varnothing_3, 2\pi]$$

where $\varnothing_{ABS}$ is maintained in the range 0 to $2\pi$ by the modulo operator, MOD. Since the phase difference between $\varnothing_2$ and $\varnothing_3$ has been arranged to vary from 0 to $2\pi$ across the measurement range, it is simple to map this to an absolute angle measurement: Absolute angle $= \varnothing_{ABS} \cdot (Absolute\ Angle\ Range/2\pi) = \varnothing_{ABS} \cdot (6.1°/2\pi)$ thus accomplishing the intended measurement of this invention.

Constraining N to an integer is a key contribution of this invention to simplify the calculation of the absolute phase, $\varnothing_{ABS}$. This is better understood when the equation for absolute phase is written in terms of the measured phases.

$$\varnothing_{ABS} = MOD\ [\varnothing_2 - N \cdot \varnothing_1, 2\pi]$$

Since there are 115 cycles of $f_2$ across the measurement range, there are 114 points in the measurement range where $\varnothing_2$ wraps, or transitions from $2\pi$ to 0. It might appear that such a dramatic change in $\varnothing_2$ would cause a significant discontinuity in $\varnothing_{ABS}$, however note that a change in $\varnothing_{ABS}$ of exactly $2\pi$ has no effect on $\varnothing_{ABS}$ due to the modulo function. A similar effect occurs when $\varnothing_1$ wraps, except that $\varnothing_{ABS}$ then changes by $N \cdot 2\pi$, which also has no effect on $\varnothing_{ABS}$ due to the modulo function. If N were not an integer, $\varnothing_{ABS}$ would contain a complicated pattern of discontinuities which would be challenging to map to the absolute angle measurement.

At this point, there is a coarse estimation of the absolute angle being measured, for example either azimuth or elevation. According to an aspect of the invention, this coarse estimate is refined even further with an iterative process, as represented by steps S610 and S612. It should be noted that any number of the iterations described below could be performed in any given implementation.

According to one aspect of the invention, measurement resolution and accuracy can be significantly enhanced by compensating for systematic errors which mostly arise due to the interaction of $f_1$ and $f_2$ in the Fourier Transform calculation. In one example implementation, the correction approach uses $\varnothing_{ABS}$, as a coarse estimate; $\varnothing_{1X}$ to refine that estimate to medium accuracy, $\varnothing_{ABS2}$; known $\varnothing_{1X}$ errors are corrected to obtain $\varnothing_{ABS3}$; the corrected $\varnothing_{1X}$, $\varnothing_{1C}$, is used to refine this estimate to medium-fine accuracy, $\varnothing_{ABS4}$; $\varnothing_{2X}$ is used to refine this estimate to fine accuracy, $\varnothing_{ABS5}$; known $\varnothing_{2X}$ errors are corrected; the corrected $\varnothing_{2X}$, $\varnothing_{2C}$, is used to refine this estimate to final, most accurate $\varnothing_{ABS6}$ and final Azimuth angle, $\theta_{X6}$.

As set forth in connection with step S610 above, the coarse estimate is calculated based on the Fourier Transform results from steps S606 and S608, $\varnothing_{1X}$ and $\varnothing_{2X}$ using, $$\varnothing_{ABS1} = MOD\ [\varnothing_{2X} - N \cdot \varnothing_{1X}, 2\pi]$$

The medium accuracy estimate, $\varnothing_{ABS2}$, is found by adjusting $\varnothing_{ABS1}$ by up to $\pm \pi$ of $\varnothing_{1X}$ so $\varnothing_{ABS2}$ agrees with $\varnothing_{1X}$. First the LINEAR implied by $\varnothing_{ABS1}$ is calculated from:

$$\varnothing_{1NEAR} = \varnothing_{ABS1} \cdot a \cdot f_1 - INT[\varnothing_{ABS1} \cdot a \cdot f_1 / 2\pi] \cdot 2\pi$$

Then the error in $\varnothing_{ABS1}$ is found for a shift by up to $\pm \pi$ from $\varnothing_{1NEAR}$ to agree with $\varnothing_{1X}$:

$$\varnothing_{ERR1} = (MOD\ [\varnothing_{1NEAR} - \varnothing_{1X} + \pi, 2\pi] - \pi)/(a \cdot f_1)$$

Finally, the identified error in $\emptyset_{ABS1}$ is removed:

$$\emptyset_{ABS2}=\emptyset_{ABS1}-\emptyset_{ERR1}$$

Next, $\emptyset_{ABS2}$ is used to find the known error in $\emptyset_{1X}$, $\emptyset_{1XERR}$, by interpolation from a table of known $\emptyset_{1X}$ errors verses $\emptyset_{ABS2}$. This table is generated in an offline process by computer simulation at a resolution of one pixel and includes the expected errors which mostly arise due to the interaction of $f_1$ and $f_2$ in the Fourier Transform calculation, which should be apparent to those skilled in the art. The length of the look-up table in $\emptyset_{ABS2}$ should extend beyond the 0 to $2\pi$ range by 1.5 cycles of $\emptyset_{1X}$ at each end. It is possible for the $\emptyset_{ABS2}$ calculation to cause a wrap error of $\pm 2\pi$ of $\emptyset_{1X}$; however this has little effect on the goal of finding $\emptyset_{1XERR}$ in the look-up table because the error function is nearly periodic in $\emptyset_{1X}$. To generate the look-up table, wrap anomalies are resolved by simply sorting the table by the independent variable, $\emptyset_{ABS2}$.

The interpolated lookup value $\emptyset_{1XERR}$, is then used to correct the previously calculated $\emptyset_{1X}$ value:

$$\emptyset_{1C}=\emptyset_{1X}-\emptyset_{1XERR}$$

Then $\emptyset_{ABS3}$ is found using the corrected $\emptyset_{1C}$:

$$\emptyset_{ABS3}=\text{MOD}\,[\emptyset_{2X}-N\cdot\emptyset_{1C},2\pi]$$

The medium-fine accuracy estimate, $\emptyset_{ABS4}$, is found by adjusting $\emptyset_{ABS3}$ by up to $\pm\pi$ of $\emptyset_{1C}$ so $\emptyset_{ABS4}$ agrees with $\emptyset_{1C}$. First the $\emptyset_{1NEARC}$ implied by $\emptyset_{ABS3}$ is calculated from:

$$\emptyset_{1NEARC}=\emptyset_{ABS3}\cdot a\cdot f_1-\text{INT}[\emptyset_{ABS3}\cdot a\cdot f_1/2\pi]\cdot 2\pi$$

Then the error in $\emptyset_{ABS3}$ is found for a shift by up to $\pm\pi$ from $\emptyset_{1NEARC}$ to agree with $\emptyset_{1C}$:

$$\emptyset_{ERR3}=(\text{MOD}\,[\emptyset_{1NEARC}-\emptyset_{1C}+\pi,2\pi]-\pi)/(a\cdot f_1)$$

Finally, the identified error in $\emptyset_{ABS3}$ is removed:

$$\emptyset_{ABS4}=\emptyset_{ABS3}-\emptyset_{ERR3}$$

If there were no measurement noise, $\emptyset_{ABS4}$ would provide a sufficient measurement, however for typical measurement noise due to a detector with 8 bit resolution and 2 bits of noise, for an effective 6 bit intensity resolution the measurement noise due to $\emptyset_{ABS4}$ may be on the order of 5 ppm. Measurement noise may be significantly reduced with the additional corrections described below.

The fine accuracy estimate, $\emptyset_{ABS5}$, is found by adjusting $\emptyset_{ABS4}$ by up to $\pm\pi$ of $\emptyset_{2X}$ so $\emptyset_{ABS5}$ agrees with $\emptyset_{2X}$. First the $\emptyset_{2NEAR}$ implied by $\emptyset_{ABS4}$ is calculated from:

$$\emptyset_{2NEAR}=\emptyset_{ABS4}\cdot a\cdot f_2-\text{INT}[\emptyset_{ABS4}\cdot a\cdot f_2/2\pi]\cdot 2\pi$$

Then the error in $\emptyset_{ABS4}$ is found for a shift by up to $\pm\pi$ from $\emptyset_{2NEAR}$ to agree with $\emptyset_{2X}$:

$$\emptyset_{ERR4}=(\text{MOD}\,[\emptyset_{2NEAR}-\emptyset_{2X}+\pi,2\pi]-\pi)/(a\cdot f_2)$$

Finally, the identified error in $\emptyset_{ABS4}$ is removed:

$$\emptyset_{ABS5}=\emptyset_{ABS4}-\emptyset_{ERR4}$$

$\emptyset_{ABS5}$ is used to find the known error in $\emptyset_{2X}$, $\emptyset_{2XERR}$, by interpolation from a table of known $\emptyset_{2X}$ errors versus $\emptyset_{ABS5}$. This table is generated by simulation at a resolution of one pixel and includes the errors which mostly arise due to the interaction of $f_1$ and $f_2$ in the Fourier Transform calculation. The length of the look-up table in $\emptyset_{ABS5}$ should extend beyond the 0 to $2\pi$ range by $\frac{1}{2}$ cycle of $\emptyset_{2X}$ at each end. It is possible for the $\emptyset_{ABS5}$ calculation to cause a wrap error of $\pm 2\pi$ of $\emptyset_{2X}$ in the presence of extreme noise levels. This determines the limit of acceptable noise.

The interpolated lookup value $\emptyset_{2XERR}$, is then used to correct the previously calculated $\emptyset_{2X}$ value:

$$\emptyset_{2C}=\emptyset_{2X}-\emptyset_{2XERR}$$

The most accurate result, $\emptyset_{ABS6}$, is found by adjusting $\emptyset_{ABS4}$ by up to $\pm\pi$ of $\emptyset_{2C}$ so $\emptyset_{ABS6}$ agrees with $\emptyset_{2C}$. The $\emptyset_{2NEAR}$ calculated previously may be used:

$$\emptyset_{2NEAR}=\emptyset_{ABS4}\cdot a\cdot f_2-\text{INT}[\emptyset_{ABS4}\cdot a\cdot f_2/2\pi]\cdot 2\pi$$

Then the error in $\emptyset_{ABS4}$ is found for a shift by up to $\pm\pi$ from $\emptyset_{2NEAR}$ to agree with $\emptyset_{2C}$:

$$\emptyset_{ERR5}=(\text{MOD}\,[\emptyset_{2NEAR}-\emptyset_{2C}+\pi,2\pi]-\pi)/(a\cdot f_2)$$

Finally, the revised error in $\emptyset_{ABS4}$ is removed:

$$\emptyset_{ABS6}=\emptyset_{ABS4}-\emptyset_{ERR5}$$

Similarly as discussed above, for a detector with 8-bit resolution and 2 bits of noise, and thus an effective 6-bit intensity resolution, the typical measurement noise due to $\emptyset_{ABS6}$ is on the order of about 2.4 ppm.

The final absolute angle (e.g. azimuth or elevation) is found from:

$$\text{Azimuth angle}=\theta_{X6}=\emptyset_{ABS6}\cdot(\text{Absolute Angle Range}/2\pi)=\emptyset_{ABS6}\cdot(6.1°/2\pi)$$

A similar procedure is used to find the corresponding orthogonal or alternative angle.

Since the above process only utilizes one row and one column of the array to find the final absolute angles, (e.g. azimuth and elevation) there is considerable additional data available which represents independent measurements of the same event. This additional data has best contrast at offsets of integral cycles of $f_1$.

As shown in step S614 of FIG. 6, the robustness of the measurement can be significantly improved by examining these multiple results and discarding any anomalous values, such as might arise due to a phase wrap error. As further shown in step S616, the remaining valid samples are averaged to further lower the noise of the measurement resulting in the measured angles. This averaging also compensates for some classes of systematic error, such as a slight misalignment of the source object and image detector array in the roll axis, which can lead to differing results on opposing sides of the array.

In step S618, the accuracy of the measurement might be further improved by calibrating to a standard with higher accuracy to obtain an error table versus position. This error table can then be used to correct the final averaged values of angle resulting in the final, most accurate measurements. These systematic errors might arise due to optical distortions, non-uniform illumination, inaccuracies in the fabrication of the spatial filter, or other effects.

It should be noted that the example methods of this invention may be utilized for repetitive measurements such as might be needed to provide feedback for a control system.

Although the invention has been described in connection with the presently preferred embodiments, the invention is not limited to the specific examples provided above, and those skilled in the art will be able to practice the invention with many variations and modifications to the above-described examples.

For example, a single, point light source and a collimating lens may be used to produce a light beam which illuminates the spatial filter. Further, the spatial filter could be illuminated from the opposite side and the reflected light could be utilized as the source object instead of the transmitted light through the filter. Still further, the beam splitter could be omitted, and the flat mirror could be replaced with a roof prism to offset the beam, with a separate collimating lens added for forming the image at the camera. As another example, the source beam aperture can be smaller than the receiving aperture and the system could have magnification other than one. As yet another example, a polychromatic or polarized light source, a polychromatic (color) or polarized spatial filter, and a polychromatic or polarized camera could be used to separate multiple waveform patterns by light wavelength (color) or polarization. As a further alternative, the angular orientation variations of any digital imaging system (camera) could be measured by viewing an object with a pattern as described above for the spatial filter and processing the digital image of the camera as described above. Still further, the system could be implemented at long range where angular changes dominate translation. As another possible variation, 2 axes of translation could be measured, instead of angles, of any digital imaging system (camera) by viewing an object with a pattern as described above for the spatial filter and processing the digital image of the camera as described above. And finally, the system could be implemented at close range where translation dominates angular changes. It is intended that the appended claims encompass these and other changes and modifications.

What is claimed is:

1. A measurement apparatus comprising:
    an object having a pattern that is affixed to a first structure and is illuminated by a light source;
    optics that cause a beam corresponding to the illuminated pattern to be projected onto a second structure; and
    a sensor that captures the beam after it strikes the second structure and forms an image corresponding to the pattern, the sensor detecting a relative orientation between the first and second structures by analyzing the image for changes in the pattern,
    wherein the pattern comprises an aharmonic variation of intensities along an axis corresponding to an angle of the relative orientation.

2. An apparatus according to claim 1, wherein the pattern comprises a first aharmonic variation of intensities along a first axis corresponding to a first angle of the relative orientation and a second aharmonic variation of intensities along a second axis corresponding to a second angle of the relative orientation.

3. An apparatus according to claim 2, wherein the first and second angles are orthogonal to each other.

4. A measurement apparatus, comprising:
    an object having a pattern that is affixed to a first structure and is illuminated by a light source;
    optics that cause a beam corresponding to the illuminated pattern to be projected onto a second structure; and
    a sensor that captures the beam after it strikes the second structure and forms an image corresponding to the pattern, the sensor detecting a relative orientation between the first and second structures by analyzing the image for changes in the pattern,
    wherein the pattern comprises an aharmonic variation of intensities along an axis corresponding to an angle of the relative orientation, and
    wherein the aharmonic variation includes a combination of first and second sinusoids having first and second different frequencies that are not harmonically related.

5. An apparatus according to claim 4, wherein the first frequency is at least two times the second frequency.

6. An apparatus according to claim 4, wherein a least common multiple of the first and second frequencies is less than a measurement range of the sensor such that the pattern received at the sensor does not repeat over the measurement range.

7. An apparatus according to claim 4, wherein the light source is polychromatic, and wherein the sensor includes a polychromatic camera.

8. An apparatus according to claim 4, wherein the light source is polarized, and wherein the sensor includes a polarized camera.

9. An apparatus according to claim 1, wherein the optics includes a collimator that passes the beam on a first path from the illuminated object toward the second structure, and on a second path from the second structure toward the sensor.

10. An apparatus according to claim 9, wherein the optics further includes a beam splitter that is disposed in both the first and second paths and further directs the beam toward the sensor on the second path.

11. An apparatus according to claim 10, wherein the optics further includes a reflector affixed to the second structure that redirects the beam from the first path to the second path.

12. A measurement method comprising:
    affixing an object having a pattern to a first structure;
    illuminating the object with a light source;
    causing a beam corresponding to the illuminated pattern to be projected onto a second structure;
    receiving the beam after it strikes the second structure;
    forming an image corresponding to the pattern from the received beam; and
    detecting a relative orientation between the first and second structures by analyzing the image for changes in the pattern,
    wherein the pattern comprises an aharmonic variation of intensities along an axis corresponding to an angle of the relative orientation.

13. A method according to claim 12, wherein the pattern comprises a first aharmonic variation of intensities along a first axis corresponding to a first angle of the relative orientation and a second aharmonic variation of intensities along a second axis corresponding to a second angle of the relative orientation.

14. A method according to claim 13, wherein the first and second angles are orthogonal to each other.

15. A measurement method comprising:
    affixing an object having a pattern to a first structure;
    illuminating the object with a light source;
    causing a beam corresponding to the illuminated pattern to be projected onto a second structure;
    receiving the beam after it strikes the second structure;
    forming an image corresponding to the pattern from the received beam; and
    detecting a relative orientation between the first and second structures by analyzing the image for changes in the pattern,
    wherein the pattern comprises an aharmonic variation of intensities along an axis corresponding to an angle of the relative orientation, and
    wherein the aharmonic variation includes a combination of first and second sinusoids having first and second different frequencies that are not harmonically related.

16. A method according to claim 15, wherein the first frequency is at least two times the second frequency.

17. A method according to claim 15, wherein a least common multiple of the first and second frequencies is less than a measurement range such that the received pattern does not repeat over the measurement range.

18. A method according to claim 15, wherein the light source is polychromatic, and wherein the receiving step includes receiving the beam using a polychromatic camera.

19. A method according to claim 15, wherein the light source is polarized, and wherein the receiving step includes receiving the beam using a polarized camera.

20. A method according to claim 12, wherein the causing step includes passing the beam through a collimator on a first path from the illuminated object toward the second structure, and on a second path from the second structure toward a sensor.

21. A method according to claim 20, wherein the causing step further includes further directing the beam toward the sensor on the second path using a beam splitter that is disposed in both the first and second paths.

22. A method according to claim 20, wherein the causing step further includes redirecting the beam from the first path to the second path using a reflector affixed to the second structure.

23. A method according to claim 12, wherein the detecting step comprises performing a Discrete Fourier Transform on the image to determine a phase in the pattern.

* * * * *